United States Patent

Tsuda et al.

[11] Patent Number: 5,901,500
[45] Date of Patent: May 11, 1999

[54] ACTUATOR FOR PIVOTABLE QUARTER WINDOW

[75] Inventors: Hirokazu Tsuda, Toyohashi; Masaaki Shimizu, Toyohahsi, both of Japan

[73] Assignee: ASMO Co., Ltd., Kosai, Japan

[21] Appl. No.: 08/982,519

[22] Filed: Dec. 2, 1997

[30] Foreign Application Priority Data

Dec. 3, 1996 [JP] Japan .................................. 8-323053

[51] Int. Cl.⁶ ...................................................... E05F 11/00
[52] U.S. Cl. .................................. 49/324; 49/340; 74/526
[58] Field of Search .......................... 49/324, 339, 340, 49/341; 74/526

[56] References Cited

U.S. PATENT DOCUMENTS

| | | |
|---|---|---|
| 4,918,865 | 4/1990 | Hirai . |
| 5,140,771 | 8/1992 | Moy et al. . |
| 5,161,419 | 11/1992 | Moy et al. . |
| 5,203,113 | 4/1993 | Yagi . |
| 5,385,061 | 1/1995 | Moy et al. . |
| 5,438,801 | 8/1995 | Ishihara et al. ................ 49/357 |
| 5,680,728 | 10/1997 | Moy ............................ 49/341 X |

FOREIGN PATENT DOCUMENTS

| | | |
|---|---|---|
| U-62-135773 | 8/1987 | Japan . |
| U-63-19684 | 2/1988 | Japan . |
| U-63-116678 | 7/1988 | Japan . |
| Y2-4-7353 | 2/1992 | Japan . |
| 2167120 | 5/1986 | United Kingdom . |
| 2169652 | 7/1986 | United Kingdom . |
| 2195392 | 4/1988 | United Kingdom . |
| 2212591 | 7/1989 | United Kingdom . |

*Primary Examiner*—Jerry Redman
*Attorney, Agent, or Firm*—Burns, Doane, Swecker & Mathis, LLP

[57] ABSTRACT

A power window actuator including an electric motor, a reduction gear train for reducing rotational speed of the motor and a linkage mechanism connected to the gear train opens and closes a pivotable quarter window or a rear side vent. The rotation of the motor is mechanically stopped by structural members totally enclosed in a housing containing the motor and the gear train when the pivotable window comes to a fully opened or a fully closed position. An electric current supply to the motor is automatically discontinued by operation of a controller. To enclose the structural members for stopping the motor in the housing, a first projection is formed on a final stage gear of the gear train and a second projection on an inside surface of the housing. Both projections abut against each other to stop the motor when the pivotable window is driven to predetermined positions. Thus, the actuator is made small in size and at a low cost.

3 Claims, 6 Drawing Sheets

ACTUATOR FOR PIVOTABLE QUARTER WINDOW

CROSS-REFERENCE TO RELATED APPLICATION

This application is based upon and claims benefit of priority of Japanese Patent Application No. Hei-8-323053 filed on Dec. 3, 1996, the content of which is incorporated herein by reference.

BACKGROUND OF THE INVENTION

1. Field of the Invention

The present invention relates to a power window actuator for a rear side vent or a rear quarter window of an automotive vehicle such as a two-door vehicle.

2. Description of Related Art

An example of a power window actuator for a pivotable quarter window of a vehicle is disclosed in Japanese utility model laid-open publication No. JP-U-63-116678. The actuator comprises an electric motor, a rotational speed reduction device and a linkage mechanism. In the actuator disclosed, the pivotable quarter window is opened or closed by operation of the actuator and stops at a fully closed or fully opened positions when the linkage mechanism abuts a part of an outside wall of a housing of the actuator. There is a possibility in this system, however, that small foreign parts be jammed or bitten between the linkage mechanism and the housing when both abut each other.

To avoid this problem, it is conceivable to control a rotational position of the motor with a potentiometer which detects a rotated angle of the motor. However, use of such a potentiometer and a control mechanism result in increasing a size of the actuator and a manufacturing cost.

SUMMARY OF THE INVENTION

The present invention has been made in view of the above-mentioned problem, and an object of the present invention is to provide an actuator for a rear quarter window which readily stops its operation at predetermined positions, avoiding jamming of foreign parts, without increasing the size of the actuator and suppressing the manufacturing cost.

The actuator for opening and closing a pivotable window according to the present invention comprises an electric motor, a speed reduction mechanism which reduces rotational speed of the motor and transmits a rotational torque, and a linkage mechanism driven by an output shaft of the speed reduction mechanism. The linkage mechanism opens and closes the pivotable window in a pivotal fashion according to signals from a driver. When the pivotable window comes to a fully opened position or a fully closed position, the rotation of the motor is mechanically restricted and an electric power supply to the motor is automatically discontinued by an operation of a controller. The rotation of the motor is mechanically restricted or stopped by structural members totally enclosed in a housing which contains therein the motor and the speed reduction mechanism.

Since the motor is stopped by the members enclosed in the housing, there is no need to make a part of the linkage mechanism abut or hit a part of the housing to stop the motor. Also, a device for detecting a rotated angle of the motor such as a potentiometer is not needed. Accordingly, the actuator can be made small in size and at a low cost.

It is preferable to form a first member for mechanically stopping the rotation of the motor on a reduction gear of the speed reduction mechanism and a second member on the housing. In an embodiment of the present invention, the speed reduction mechanism has a reduction gear train constituted by a plurality of gears, a first stage gear of which engages with an output shaft of the motor and a final stage gear is connected to the linkage mechanism. The first member for stopping the motor is formed on the final stage gear integrally therewith and the second member is fixedly formed on an inside surface of the housing. When the pivotable window comes to fully opened or fully closed positions, the first and second member abut against each other, thereby stopping the rotation of the motor.

Further, it is preferable to form an annular depression on the final stage gear so that a projection as the first stopping member can be formed within the annular depression. In this way, an axial length of the final stage gear can be kept smaller. To reduce a mechanical impact and noise caused when the stopping members abut against each other, a shock absorbing member made of a resilient material is preferably disposed on one of the stopping members.

Other objects and features of the present invention will become more readily apparent from a better understanding of the preferred embodiment described below with reference to the following drawings.

DETAILED DESCRIPTION OF THE PREFERRED EMBODIMENT

Figure 1:
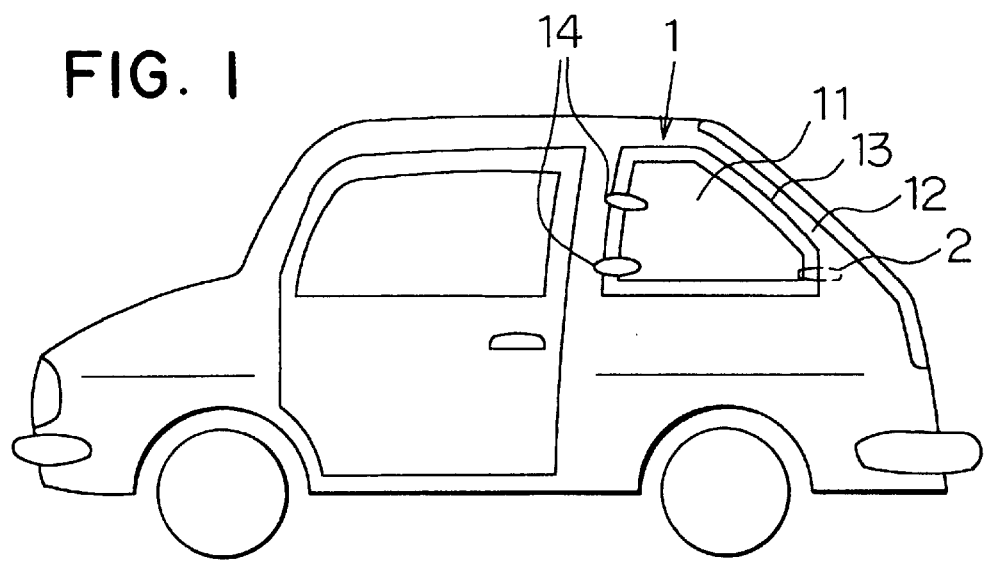
FIG. 1 shows an example of a vehicle which has a rear side vent or a rear quarter window.

A preferred embodiment according to the present invention will be described referring to the accompanying drawings. FIG. 1 shows an example of an vehicle having a rear side vent or a rear quarter window 1 (hereinafter referred to as a window). A window frame 12 of the vehicle forms an opening 11 on which a window glass 13 is mounted and pivotably connected to the window frame 12 with hinges 14 so that the window glass 13 pivotally opens or closes the opening 11. An actuator 2 for pivotally opening and closing the window glass 13 is mounted on the window frame 12 and connected to the other end of the window glass 13.

Figure 2:
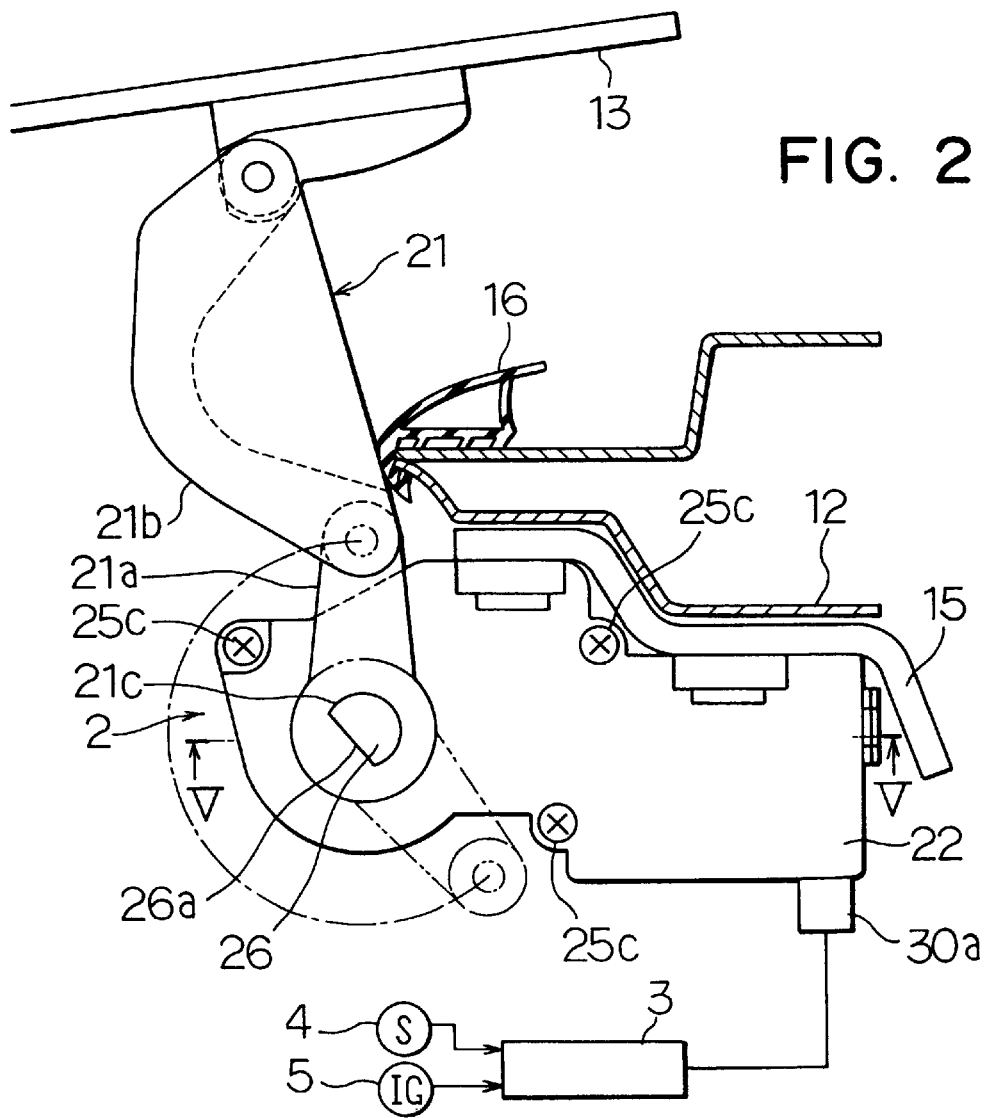
FIG. 2 is a front view showing an actuator for a rear quarter window according to the present invention.

As shown in FIG. 2, the actuator 2 is composed of a linkage mechanism 21 including a pair of first links 21a and a second link 21b and an actuator body 22 which drives the linkage mechanism 21. The actuator body 22 is fixed to the window frame 12 by means of a bracket 15. A packing or a weather strip 16 made of rubber is disposed on the window frame 12 so that the window glass 13 tightly closes the window opening 11 when the window glass 13 is brought to the closing position by the actuator 2.

Figure 3:
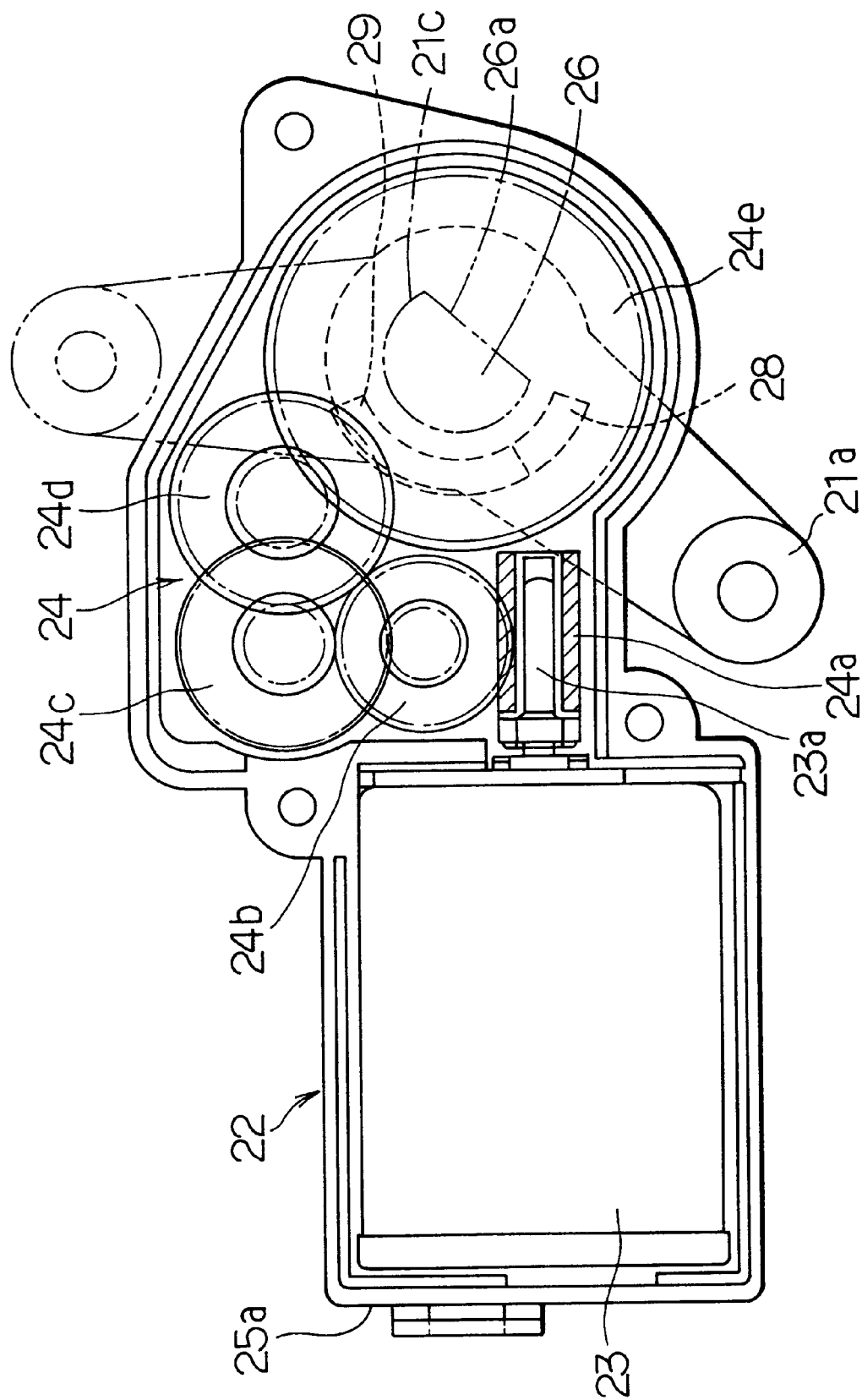
FIG. 3 is a cross-sectional view showing the actuator taken along a line III—III in FIG. 4.
Figure 4:
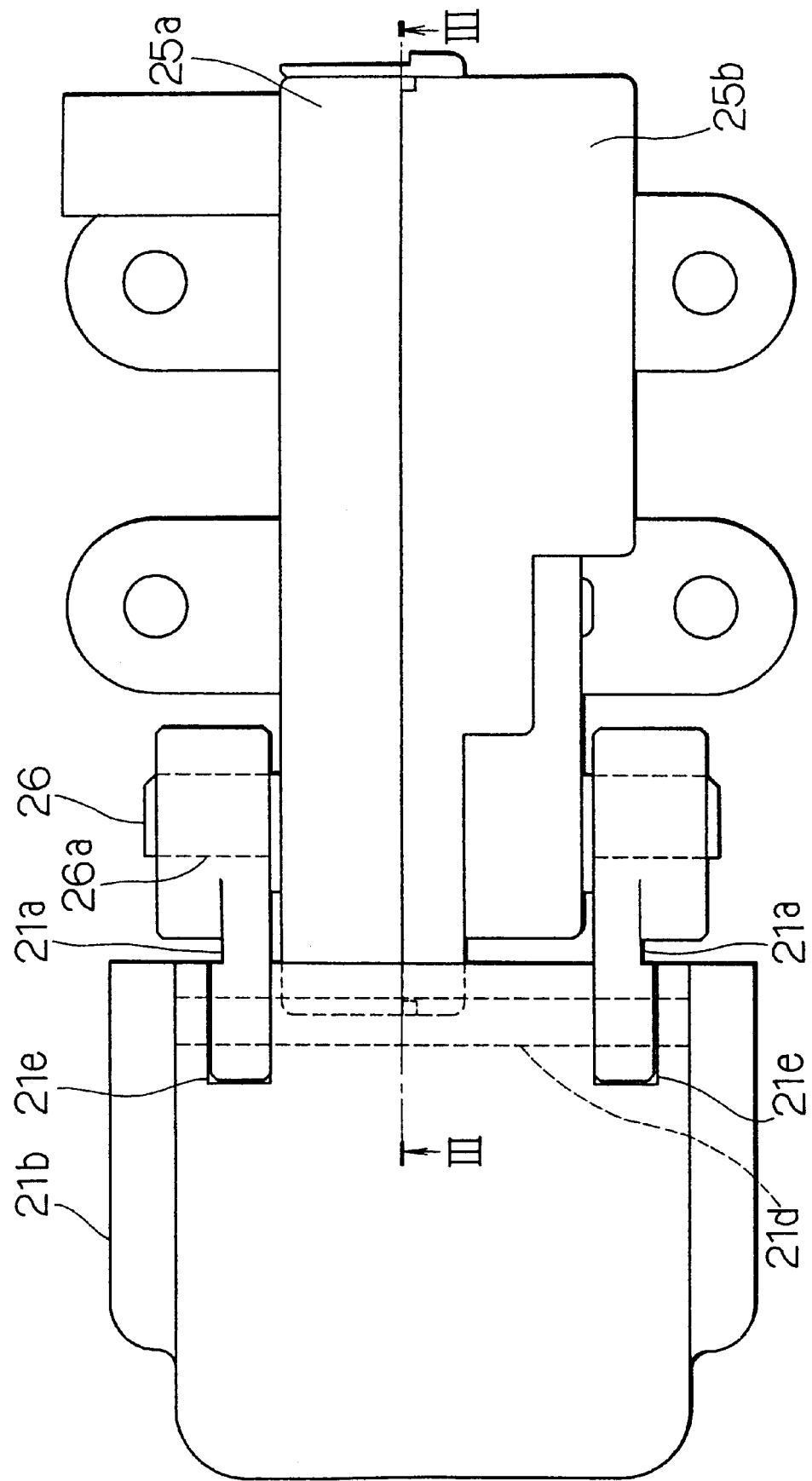
FIG. 4 is a top view showing the actuator shown in FIG. 2.

FIG. 4 shows a top view of the actuator 2, and FIG. 3 shows a cross-sectional view of the actuator 2 taken along a line III—III of FIG. 4. The actuator body 22 includes an electric motor 23 which drives the linkage mechanism 21, a speed reduction mechanism 24 which reduces a rotational speed of the motor 23 and transfers a driving torque to the linkage mechanism mechanism 21, and a pair of housings, a first housing 25a and a second housing 25b, for containing therein the motor 23 and the reduction mechanism 24. The first and second housings 25a and 25b are fastened together with screws 25.

As shown in FIG. 3, the reduction mechanism 24 is composed of a worm 24a connected to an output shaft 23a of the motor 23, a worm wheel 24b engaging with the worm 24a, and three spur gears 24c, 24d and 24e. The spur gear 24e is a final stage gear of the reduction mechanism, and an output shaft 26 connected to the first link 21a is provided on the final stage spur gear 24e integrally therewith. A linking surface 26a is provided on the output shaft 26, and a linking hole 21c is provided on the first link 21a. The output shaft 26 of the reduction mechanism and the first link 21a are connected to each other by engaging the linking surface 26a with the linking hole 21c.

As shown in FIG. 4., a pair of the first links 21a are connected, respectively, to both ends of the output shaft 26 sticking out from the housings 25a and 25b. A pair of slits 21e into which the first links 21a are inserted are provided on the second link 21b. The pair of the first links 21a and the second link 21b are connected to each other with a spring pin 21d so that the second link 21b can pivot relative to the pair of the first links 21a. The spring pin 21d is a pin having a resiliently deformable outer diameter as defined in JIS B 2808, and is fixedly inserted into holes provided on the second link 21b and rotatably inserted into holes of the first links 21a.

Figure 5:
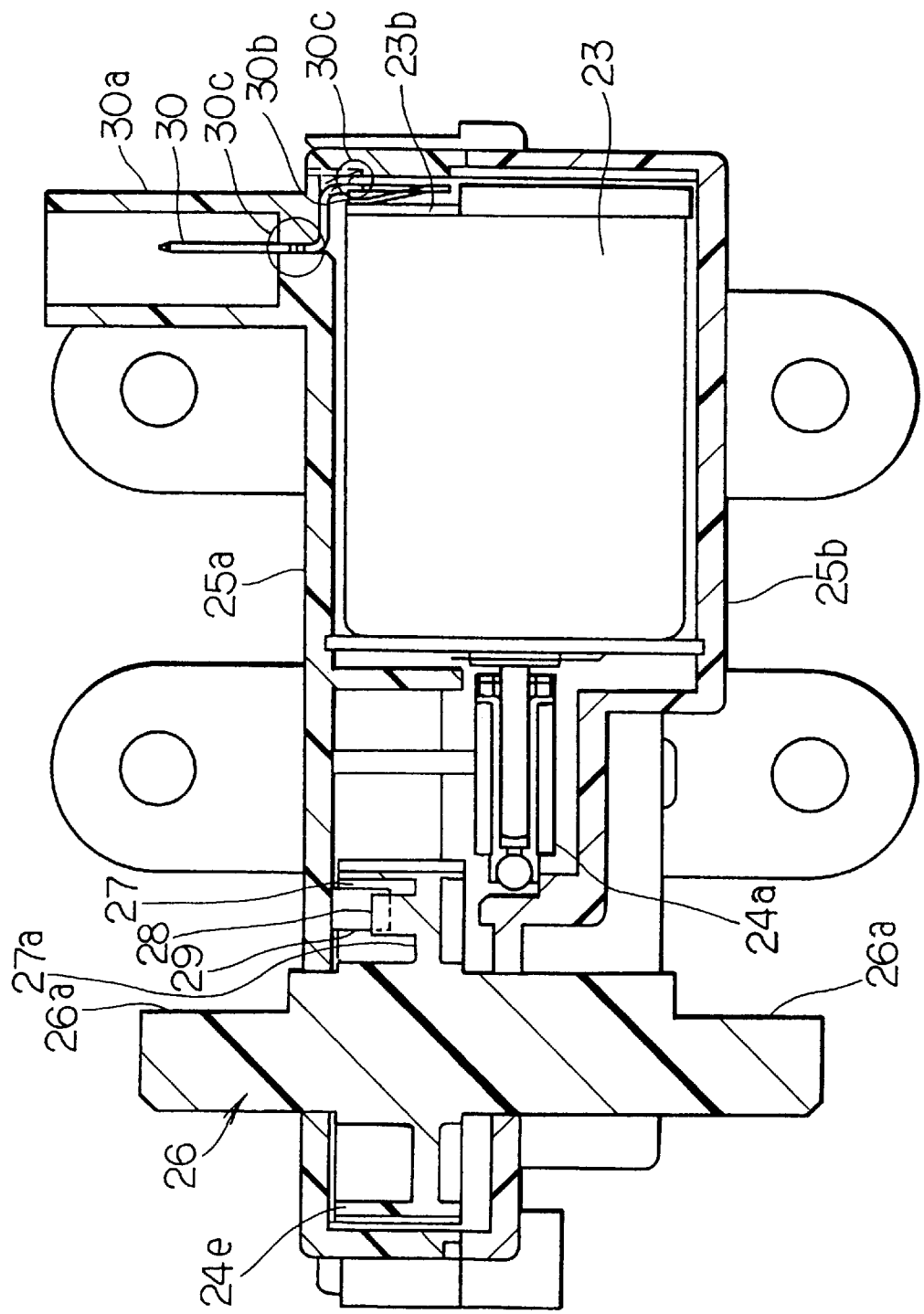
FIG. 5 is a cross-sectional view showing the actuator taken along a line V—V in FIG. 2.
Figure 6:
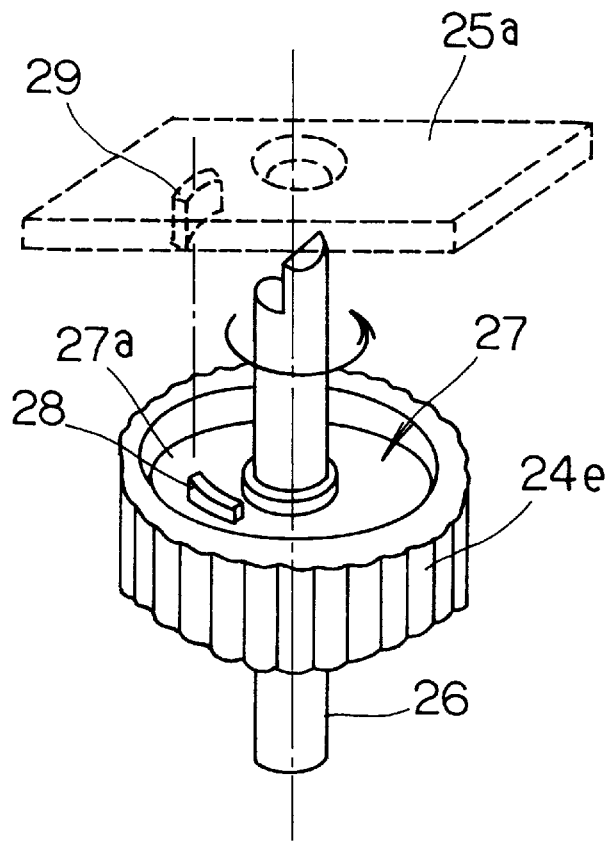
FIG. 6 is a perspective view showing an output shaft and a final stage spur gear of a reduction mechanism used in the actuator.

As shown in FIGS. 5 and 6, an annular depression 27 facing the first housing 25a is formed on the final stage spur gear 24e. On a bottom surface 27a of the annular depression 27, a projection 28 is formed integrally with the spur gear 24e. Another projection 29 is fixedly formed on the first housing 25a, facing the annular depression 27. The worm 24a and spur gears 24b–24e constituting the reduction mechanism are all made of resin.

Figure 7:
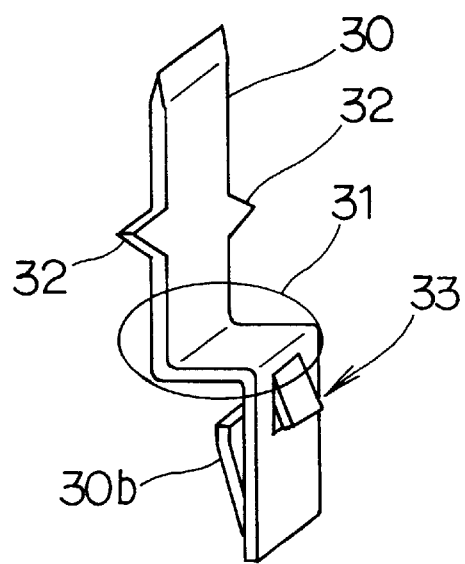
FIG. 7 is a perspective view showing a connector terminal used in the actuator.

As shown in FIG. 5, a metal connector terminal 30 for supplying electric power to the motor 23 is provided on the housing 21a. The connector terminal 30 is angled with a bent portion 31 as shown in FIG. 7. One end of the connector terminal 30 sticks out in a terminal cover 30a, and the other end contacts a motor terminal 23b for electrically connecting the connector terminal 30 to the motor 23. As seen in FIG. 7, the connector terminal 30 includes a contacting portion 30b formed integrally with the terminal 30 which contacts the motor terminal 23b with a spring action. The connector terminal 30 also includes a pair of triangle projections 32 for fixing the connector terminal 30 to a portion 30c of the first housing 25a and a sticking-out portion 33 for fixing the connector terminal 30 to an axial end of the housing 25a. The connector terminal 30 is fixed to the housing 25a by the triangle projections 32, a spring action of the sticking-out portion 33, and a frictional force between the connector terminal 30 and the housing 25a generated by the bent portion 31.

Now, the operation of the actuator according to the present invention will be described below. The motor 23 of the actuator 2 is controlled by a controller 3 to which a signal from a switch 4 indicating driver's intention to open or close the quarter window and a signal from an ignition switch 5 indicating whether the ignition switch is at positions which allow the motor to be operated are input (refer to FIG. 2). The motor 23 is operated according to the signal from a driver only when the signal from the ignition switch 5 indicates that an engine is in operation or an accessory switch is on.

When the signal from the switch 4 indicates to open the quarter window, the motor 23 rotates in a direction to open the quarter window and the projection 28 formed on the final stage spur gear 24e also rotates together with the motor 23. As the projection 28 rotates by a predetermined angle, it (one end) abuts against the fixed projection 29 formed on the first housing 25a, thereby forcibly preventing the motor rotation. The positions of the projections 28 and 29 are predetermined so that they abut each other when the quarter window is fully opened. As the motor 23 is forcibly stopped, electric current supplied to the motor increases. The controller 3 detects the electric current increase and shuts off the current supply to the motor 23 when the current exceeds a predetermined value.

On the other hand, when the signal from the switch 4 indicates to close the quarter window, the motor 23 rotates in a direction to close the quarter window and the projection 28 also rotates together with the motor. When the quarter window comes to the fully closed position, the projection 28 (the other end) abuts against the fixed projection 29, thereby forcibly preventing the motor rotation. This is detected by the controller 3 in the same manner as above, and the current supply to the motor 23 is discontinued. The fully opened position of the first link 21a in FIG. 2 is shown with a solid line and the fully closed position with a dotted line.

Incidentally, to avoid a situation where the quarter window is left open after the ignition switch is turned off, a signal to close the quarter window is automatically generated in the controller 3 when the ignition switch is turned off.

As described above, since the both projections 28 and 29 which forcibly stop the motor 23 when they abut each other are disposed in the housings 25a and 25b and enclosed therein, there is no need to make a part of the linkage abut against a part of the housing to stop the motor 23. Therefore, the possibility of foreign part jamming between the linkage and the housing is avoided. Also, there is no need to provide a potentiometer to detect a rotational angle of the motor.

Accordingly, unnecessary increase of the actuator size and production cost is avoided. In addition, since the projection 28 is formed inside of the annular depression 27 of the final stage spur gear 24e, an axial length of the spur gear 24e does not become larger because of the projection 28.

Figure 9:
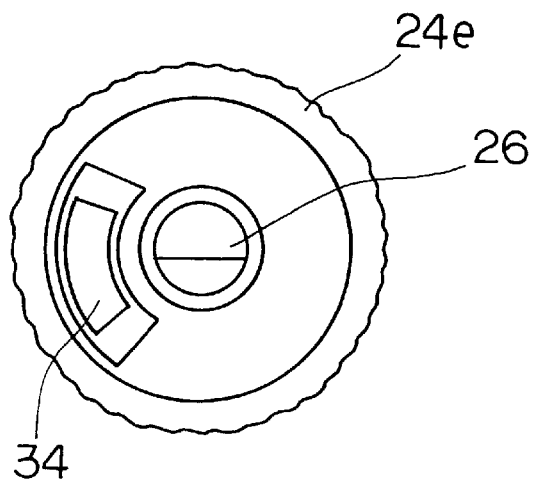
FIG. 9 is a plan view showing a modification of the final stage spur gear shown in FIG. 6.

The projections 28 and 29 abut directly against each other when the motor 23 rotates up to the positions to be stopped in the embodiment described above. In order to alleviate the direct abutting impact, the projection 28 may be modified in a form shown in FIG. 9 in which a cover 34 made of a resilient material such as rubber is disposed on the projection 28. Such a resilient cover may be disposed on the fixed projection 29. For the same purpose, the projections 28 and 29 themselves may be made of a resilient material. By thus alleviating the abutting force of the projections 28 and 29, durability of the reduction mechanism 24 is improved and noise caused by the abutting of the projections can be reduced at the same time.

Though all the gears constituting the reduction mechanism 24 are made of resin in the embodiment described above, they may be made of a metallic material. Also, the integrally made output shaft 26 and final stage spur gear 24e may be made separately. The fixed projection 29 formed on the first housing 25a may be moved to the second housing 25a. The position of the projection 28 is not limited to the position described above, but it may be variably selected. It may be formed on the axial end surface of the spur gear 24e, the annular depression 27 being eliminated, or on the inner surface (not on the bottom surface 27a) of the annular depression 27.

In the linkage mechanism 21, a pair of the first links 21a are connected to the output shaft 26 at both sides thereof and inserted into the slits 21e of the second link 21b as shown in FIG. 4. The first and second links 21a and 21b are pivotably connected to each other with a spring pin 21d. Therefore, the first links 21a do not drop off from the output shaft 26 as far as the connection between the first and second links 21a and 21b is secured, even when the linkage mechanism 21 as a whole is displaced slidably along an axial direction of the output shaft 26. Accordingly, there is no need to provide any means for fixing the first links 21a to the output shaft 26. This contributes to saving the production cost. This structure of connecting the first links 21a to the second link 21b also provides a high mechanical strength of the linkage mechanism 21 as a whole.

The connector terminal 30 having an angled shape as shown in FIG. 7 is simply inserted into the position shown in FIG. 5. The connector terminal 30 is securely held in the first housing 25a by the triangle projections 32 and a spring action of the sticking-out portion 33. One end of the connector terminal 30 extends to an inner space of the connector cover 30a, and the other end contacts the motor terminal 23b with a spring force of the contacting portion 30b for securing an electrical contact therebetween. Therefore, an assembling process of the connector terminal 30 is much easier, compared with a conventional electrical connection using a lead wire.

Figure 8A:
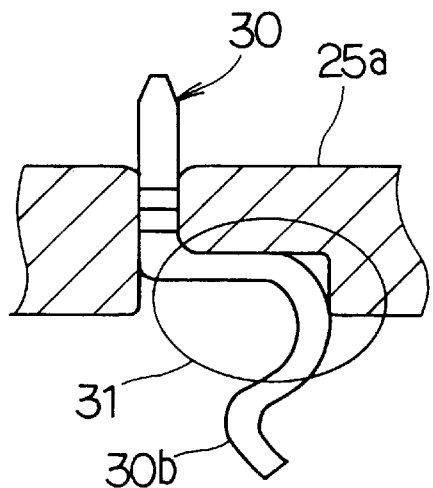
FIGS. 8A–8C are perspective views showing modified forms of the connector terminal shown in FIG. 7.
Figure 8B:
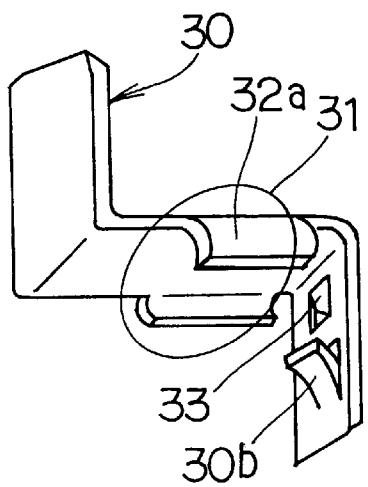
Figure 8C:
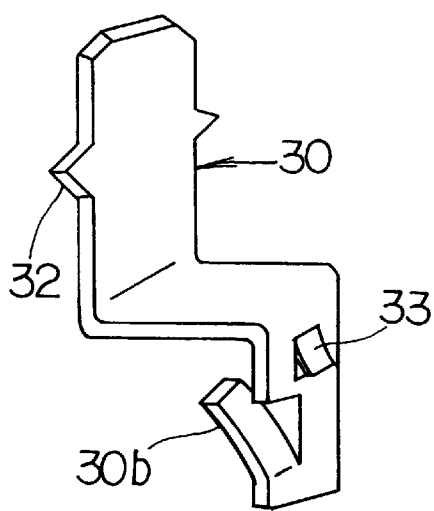

The connector terminal 30 having a crank-angled shape shown in FIG. 7 may be modified as shown in FIG. 8A in which the bent portion 31 has a U-shape or an S-shape. Also, the triangle projection 32 may be replaced with rounded portions 32a as shown in FIG. 8B. The contacting portion 30b which is formed by cutting and raising a center portion of the terminal plate (FIG. 7) may be modified as shown in FIG. 8C in which the contacting portion 30b is formed at one side of the terminal plate. Though the connector terminal 30 is disposed to extend in a radial direction of the motor 23 in the embodiment described above, it may be installed to extend in an axial direction of the motor 23. In this case, the connector terminal 30 may be made intergrally with the motor terminal 23b, the triangle projections 32 and the sticking-out portion 33 for fixing the connector terminal 30 to the housing being eliminated. Also, the bent portion 31 may be eliminated, making the connector terminal 30 with a straight shape. In this case, the connector terminal 30 is held in the housing only by the triangle projections 32 and the sticking-out portion 33 without using the spring force of the bent portion 31.

The foregoing embodiment of the present invention is described, assuming it is used for a pivotable quarter window. However, it can be readily used for operating other pivotable windows such as a roof window of a vehicle.

While the present invention has been shown and described with reference to the foregoing preferred embodiment, it will be apparent to those skilled in the art that changes in form and detail may be made therein without departing from the scope of the invention as defined in the appended claims.

What is claimed is:

1. An actuator for opening and closing a pivotable window comprising:

an electric motor;

a rotational speed reduction mechanism, for reducing rotational speed of the motor, having a train of a plurality of gears which include a first stage gear engaging with the motor and a final stage gear;

a housing containing therein the electric motor and the rotational speed reduction mechanism;

a linkage mechanism, connected to the final stage gear of the rotational speed reduction mechanism; for pivtoally opening and closing the pivotable window; and means, including a first member formed on the final stage gear and a second member formed on the housing, which mechanically stops rotation of the motor when the first and the second members abut against each other, wherein:

the final stage gear includes an annular depression formed coaxially with its axis; and the first member is a projection formed within the annular depression.

2. The actuator for opening and closing a pivotable window as in claim 1, wherein:

at least one of the first and the second members includes a shock absorbing member for alleviating impact generated when the first and the second members abut against each other.

3. The actuator for opening and closing a pivotable window as in claim 1, wherein:

the projection formed within the annular depression does not extend beyond an axial length of the final stage gear.

* * * * *